(12) United States Patent
Hart

(10) Patent No.: US 6,430,577 B1
(45) Date of Patent: Aug. 6, 2002

(54) SYSTEM AND METHOD FOR ASYNCHRONOUSLY RECEIVING MULTIPLE PACKETS OF AUDIT DATA FROM A SOURCE DATABASED HOST IN A RESYNCHRONIZATION MODE AND ASYNCHRONOUSLY WRITING THE DATA TO A TARGET HOST

(75) Inventor: Donald Ralph Hart, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/415,273

(22) Filed: Oct. 8, 1999

(51) Int. Cl.[7] .............................................. G06F 17/30
(52) U.S. Cl. ...................... 707/201; 707/10; 707/204; 709/248; 714/20
(58) Field of Search ........................... 707/10, 201–204; 714/2, 4, 6, 8, 10, 15–16, 19–20, 12, 33; 709/226, 237, 239, 248

(56) References Cited

U.S. PATENT DOCUMENTS

| 5,404,508 A | * | 4/1995 | Konrad et al. ............... 707/201 |
| 5,758,150 A | * | 5/1998 | Bell et al. ...................... 707/10 |
| 5,794,252 A | * | 8/1998 | Bailey et al. ................ 707/202 |
| 5,937,413 A | * | 8/1999 | Hyun et al. .................. 707/201 |
| 5,970,502 A | * | 10/1999 | Salkewicz et al. .......... 707/201 |
| 6,122,630 A | * | 9/2000 | Strickler et al. ............... 707/8 |

* cited by examiner

Primary Examiner—Hosain T. Alam
(74) Attorney, Agent, or Firm—Alfred W. Kozak; Mark T. Starr; Lise A. Rode

(57) ABSTRACT

In order to obviate data discrepancy between a primary source database and a secondary remote backup database, a Tracker program is used to sense the lack of synchronism between a primary audit file and secondary audit file. Then, a Catch-up program operates to transfer sectioned audit files from the primary to secondary in a parallel transfer mode until the primary and secondary audit files are accurate duplicates of each other, i.e., they are now in synchronism.

6 Claims, 9 Drawing Sheets

SYSTEM AND METHOD FOR ASYNCHRONOUSLY RECEIVING MULTIPLE PACKETS OF AUDIT DATA FROM A SOURCE DATABASED HOST IN A RESYNCHRONIZATION MODE AND ASYNCHRONOUSLY WRITING THE DATA TO A TARGET HOST

CROSS REFERENCES TO RELATED APPLICATIONS

This application is related to a co-pending application U.S. Ser. No. 09/374,351 entitled: "Enhanced System and Method for Management of System Database Utilities", which is incorporated herein by reference.

This application is also related to co-pending application U.S. Ser. No. 09/415,333 entitled "Tracker Sensing Method For Regulating Synchronization of Audit Files Between Primary And Secondary Hosts", which is also incorporated herein by reference.

FIELD OF THE INVENTION

This disclosure relates to network Communications where logical audit blocks are created at a source host and transferred to a remote host where the audit trail is used to create and maintain a continuously synchronized remote database backup.

BACKGROUND OF THE INVENTION

A database such as the Unisys Data Management System II, Extended, is a centralized collection of data placed into one or more files. Multiple application programs can access this data concurrently. Consequently, redundant files are not required for each individual application. Application programs running in batch, time sharing, and reload job entry environments can all access the database concurrently. A database of the present configuration consists of the following major components:

(a) Data sets;
(b) Sets;
(c) Subsets;
(d) Data items;
(e) Global data.

A data set, a set, or a subset, that is not an item of another set is termed disjoint. Structures need not be disjoint, that is to say a hierarchy can exist between the various data sets, sets, and subsets. A data set, a set, or a subset, that is an item in another data set, is said to be embedded. When a database contains embedded structures, a hierarchical file structure results.

A data set is a collection of related data records stored in a file in a random access storage device. A data set is similar to a conventional file. It contains data items and has logical and physical properties similar to files. However, unlike conventional files, data sets can contain other data sets, sets, and subsets.

A set is a structure that allows access to all records of a data set in some logical sequence. The set contains one entry for each record in the data set. Each set entry is an index that locates a data set record. If key items are specified for the set, records in the data set are accessed based upon these keys. Otherwise the records are accessed sequentially. Multiple sets can be declared for a single data set, thereby enabling the data in a data set to be accessed in several different sequences. A subset is similar to a set. Unlike a set, a subset need only refer to selected records in the data set. A data item is a field in a database record used to contain an individual piece of information.

Data items that are not a part of any data set are then called global data items. Global data items generally consist of information such as control totals, hash totals, and populations, which apply to the entire database. All global data items are stored in a single record.

The audit trail is a record of changes made to the database. The audit trail is used to recover automatically the database following a hardware or software failure. The audit trail specification clause describes the physical attributes of the audit trail.

The audit trail, as mentioned, consists of a record of changes to the database. It is only created for audited databases and is used in the various forms of database recovery.

An audit trail specification describes the attributes of the audit trail. The specification is optional. If no specification appears, attributes are assigned by default.

All audited databases must include a "restart" data set definition. There is a specialized syntax for specifying the audit trail attributes. These involve area size, area length, block size, buffers, checksum, and sections in addition to whether disk or tape is involved and types of tape being used.

The areas, area size, and area length are involved which indicate that disk or pack files are divided into areas. Areas are only allocated as they are needed. Thus, a potentially large file can be small initially and then grow as needed. The user can control the maximum amount of disk space allocated to a file by using the AREAS and AREASIZE (or the AREALENGTH) options.

AREAS specifies the maximum number of areas to be assigned to the file. The maximum value allowed for this is 1,000.

The user can specify the length of an area using the AREASIZE (or AREALENGTH) option. The default option for AREASIZE is BLOCKS. The default value is 100 blocks.

BLOCKSIZE: The records in the audit trail are normally blocked. The user can control the size of a block using the BLOCKSIZE option. BLOCKSIZE can be specified as one of the following items:

(i) SEGMENTS: The maximum value is 2,184 segments. SEGMENTS can define an audit buffer size that is larger than that defined by either the BYTES or WORDS option.

(ii) WORDS: This is the default option. If a User does not define a BLOCKSIZE, the audit trail will use a default BLOCKSIZE of 900 words. The maximum value here is 4,095 words.

(iii) BYTES: The maximum value allowed here is 24,570 bytes.

A Remote Database Backup or RDB is a database recovery system which can be a key component of a disaster recovery plan since it minimizes the amount of time needed to recover from a loss database access. The RDB system also minimizes the loss of productivity, minimizes the loss of revenue and minimizes the loss of business, which could occur because of interruptions in the ability to access one's database. The RDB works in conjunction with the Data Management System II (DMSII) databases plus Structured Query Language Database (SQLDB), the Semantic Information Manager (SIM) database, and the Logic and Information Network Compiler II (LINCII) databases.

The components of the RDB system consist of a database and also a copy of the database. One database is update capable and the other database can be used only for inquiry purposes. The update-capable database is called the primary database. The host on which this database resides is called the primary host. The "current on-line" remote database copy, which is called the secondary database, is "inquiry-capable" only. The host on which this database resides is called the secondary host. The configuration of the primary and the secondary databases on-their separate hosts is called the RDB System. A single host can participate in multiple RDB systems.

The RDB or remote database backup system enables users to maintain a current on-line inquiry-only copy of a database on an enterprise server, which is separate from the enterprise server on which the update-capable database resides. The host locations can be at the same site or at two geographically distant sites. The remote database backup keeps the database copy up-to-date by applying the audit images from the audited database to the database copy. There is a choice of four audit transmission modes which enables one to choose the means of audit transfer between hosts.

In the RDB system, the term "primary" and the term "secondary" will indicate the intended function of each copy of the database and the host on which it resides.

The primary database has the function for database inquiry and update, while the secondary database has the functionality useful for database inquiry only.

The secondary database cannot be updated by any application programs and the secondary database is modified only by the application of audit images of transactions performed on the primary database.

Since one complete RDB system is made of one database, and includes the secondary database which resides on another host, that is to say the primary database on one host plus one copy of that database.

A host is the system on which a primary or a secondary database resides. A host can function as a primary host in one RDB system and then also concurrently function as a secondary host for another RDB system. Additionally, one host can function as a secondary host (or a primary host) for multiple RDB systems.

When a RDB system is first initialized for a database, then by default, the primary host is the host upon which the database resides. The other host which is defined for that database is designated as a secondary host and it remains a secondary host until a takeover is performed or until the RDB capability is disabled. Both the primary and secondary hosts must have sufficient resources to support the RDB system and its application environment.

As an illustration, it can be seen how the primary database on a system, which is called Host One and the secondary database is applied on a system called Host Two can work together in response to or in anticipation of an interruption on the primary host. In this example, the application normally runs against the primary database in Host One with the RDB transferring audit images to the secondary database. Under normal operation, which is when the audit images are transferred from the primary database to the secondary database without loss of data during transmission due to network or system failure, the example described above works well. However, in the condition that a network or system failure results in the loss of data during transmission from the primary database to the secondary then the secondary database is said to be out of synchronization with the primary database. Hence there is need of a mechanism by which the lost data can be re-transmitted so that the secondary database can be re-synchronized with the primary one.

The object of the present invention is to synchronize a backup database by realizing the performance improvement achieved by asynchronously receiving multiple packets of sectioned audit data from the source database host over a communications network and then asynchronously writing audit data to multiple physical files at a target host backup database.

In order to accomplish this object, there is utilized a logical resynchronization process, which hereinafter is referred to as Catch-up, which according to the present system consists of multiple backup database system at the remote host. Then initially, the backup system recognizes that a resynchronization process is required and then from its shared database library task (RDB Support Library) initiates a single physical Catch-up task for each physical audit file partition in a parallel transfer operation.

AUDIT TRAIL SYNCHRONIZATION: it is of some importance to decide on what is called audit level synchronization that is desired for the remote database backup system. This involves the question of "how closely must the backup database match its source database? Or to express it in an other fashion, how closely synchronized should the secondary database audit trail be a replicate of the primary database audit trail?"

MODES OF AUDIT TRANSMISSION: The remote database backup (RDB) system provides four specific audit transmission modes that enable the user to regulate whether the transmission of the audit images is to be automatic or manual; whether the transmission of audit images is to be done as individual audit blocks or entirely whole audit files; whether the transmission of audit images can be interrupted, that is to say, suspended or not; and what is to be the degree of audit trail synchronization between the primary host and the secondary host. The focus of the present invention involves the use of one mode designated as the ABW or Audit Block write mode.

AUDIT BLOCK WRITE (ABW): The secondary audit trail is to be constantly and automatically kept synchronized with the primary database audit trail on a block-by-block basis. The ABW mode enables this type of close synchronization level to occur by (i) handling interruptions to audit transmissions through one of two error handling options; or (ii) initiating a Catch-up process for the audit block transfer whenever the usual synchronization level is disrupted. This invention is devoted to the Catch-up process.

In the RDB utility, the user can specify the time interval between the detection of a need for the Catch-up process and the beginning of that process.

SUMMARY OF THE INVENTION

A method of asynchronously receiving multiple packets of audit data from partitioned audit files of a source database host in a resynchronization mode and asynchronously writing the data at a target host for the process of maintaining a remote database backup A source database creates an audit trail by serially writing logical audit blocks to a serially contiguous ordering of logical audit files. As logical audit blocks are created at a source host they are transferred via port file network communication to a remote host where the audit trail is used to create and maintain a continuous remote database backup.

In the event of transmission delays or a network failure, the audit trail at the remote host becomes out-of-sync, requiring a resynchronization process (designated as Catch-up operations) to transfer larger than normal amounts of audit blocks at a faster rate in order to synchronize the audit trails once network communication resumes. By asynchronously receiving multiple logical audit blocks and asynchronously writing them to multiple physical files via parallel buffers, the audit trails become synchronized quicker than if said process were performed in a serial mode of operation.

GLOSSARY LIST

Figure 1:
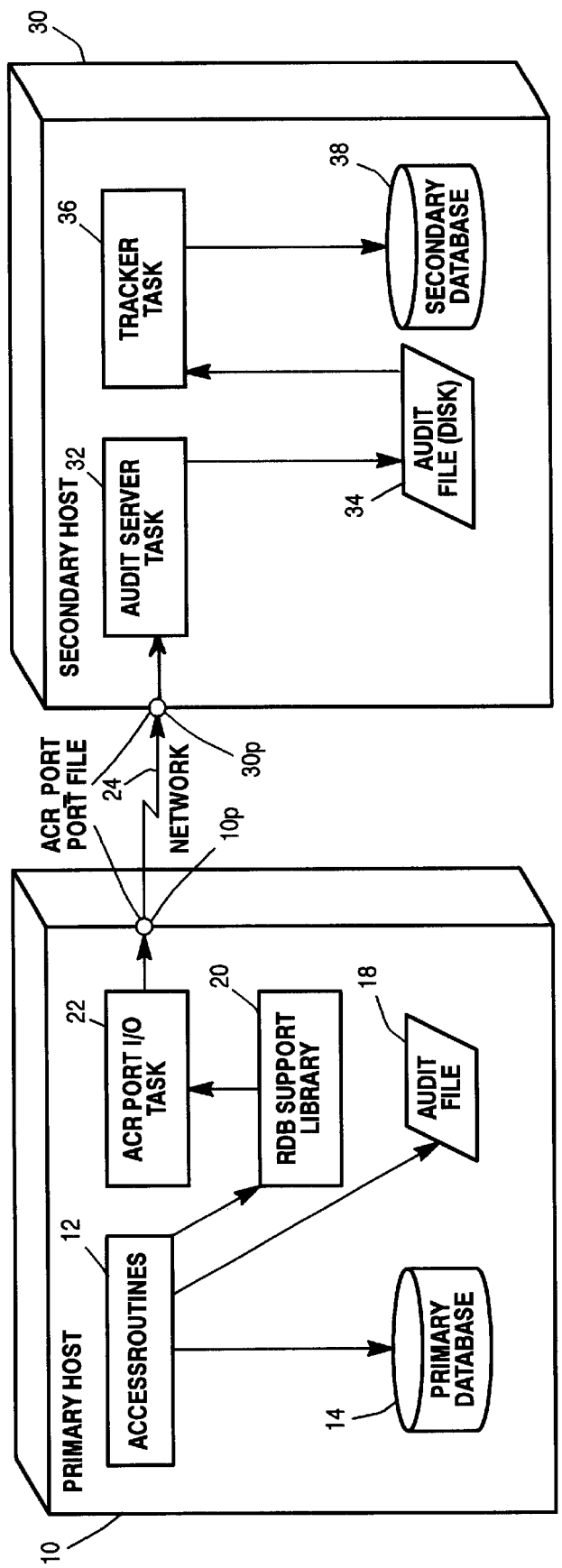
FIG. 1 is a drawing showing the normal flow of audit blocks in the Automatic Block Write mode between a primary host and secondary host.

ACR: Abbreviation for Accessroutines, the software component of the DMSII product that is primarily responsible for the accessing (creating, modifying and deleting) of data in a DMSII database and auditing all changes to the database.

AUDIT: An examination of systems, programming and data center procedures in order to determine the efficiency of a computer system.

AUDIT DATA: For DMSII databases, data that records every change to a predefined database.

AUDIT FILE: For DMSII databases, a file produced by the Accessroutines that contains various control information, including before and after images of records resulting from changes to the database.

AUDIT FILE VS. AUDIT BLOCK: For DMSII databases, the audit file represents one or more physical files that contain audit blocks that are stored sequentially.

AUDIT FILE SWITCH: For DMSII databases, the logical time when one audit file is complete and a new one is started.

AUDIT IMAGES: For DMSII databases, structured package of data representing change to the database that are stored sequentially into the audit trail.

AUDIT SOFTWARE: These are specialized programs to perform a variety of auditing functions, such as sampling databases or possibly generating confirmation letters to customers. It can be used to highlight certain exceptions to categories of data and alert the user to possible errors. Audit software may often include a non-procedural language that lets the auditor-user describe the computer and the data environment without need for detailed programming.

AUDIT TRAIL: This is a record of transactions in an information system that provides verification of the activity of the system. The simplest audit trail is a transaction itself. For example, if an employee's salary is increased, the changed transaction will include the date, the amount of the raise, and the name of the authorizing manager. It is possible to create a more elaborate audit trail when the system is being verified for accuracy. For example, samples of processing results can be recorded at various stages. Item counts and hash totals can be used to verify that all input has been processed through the system. For DMSII databases, the sequence of audit files that are created and span the life of the database.

CATCHUP: In an RDB system, the process that brings the remote audit trail back into synchronization with the source audit trail following a suspension of normal audit transfer.

CATCHUP TASK: In an RDB system, a physical process that runs at a remote host, reads audit data from a port file connected to a source database, and writes the data to a physical audit file.

DMSII XE: This denotes a Unisys Corporation Data Management System-Extended.

FASTER AUDIT GENERATION: For DMSII databases, a rate of audit generation that can be achieved by using sectioned audit and multiple processors.

FILE: A collection of bytes which is stored as an individual entity. For example, all data on disk is stored as a file with an assigned file name that is unique within the directory it resides in. To the computer, file is only nothing more than a series of bytes. The structure of a file is known to the software that manipulates it. For example, database files are made up of a series of records. Word processing files (also called documents) contain a continuous flow of text.

FILE ATTRIBUTE: A file access classification that allows a file to be retrieved or erased. Typical attributes are read/write, read only, archive, and hide or hidden.

FILE FORMAT: This is the structure of a file. There are hundreds of proprietary formats for a database, for word processing, and for graphics files.

FILE MAINTENANCE: (i) This is the periodic updating of master files. For example, this might include adding/deleting employee names and customer names, or making address changes or changing product prices. This does not refer to daily transaction processing and batch processing, such as order processing and billing and so on. (ii) The periodic reorganization of a disk drive. Data that is continuously updated becomes physically fragmented over the disk space and requires regrouping. An optimization program can be run daily or weekly in order to rewrite all the files on a contiguous basis.

FILE MANAGER: (i) This is software that manages data files and is not to be confused with a database manager. The file managers provide the ability to create, enter, change, query, and produce reports on one single file at a time. There is no relational capability and it does not involve a programming language. (ii) Often used for software used to manage files on a disk. It provides functions to delete, copy, remove, and view files as well as to create and manage directions.

FILE NAME: This is a name assigned by the user or the programmer that is used to identify a particular file.

FILE SERVER: This is a high speed computer in the local area network (LAN) that stores the programs and the data files shared by users of the network. Sometimes it's called a network server and it acts like a remote disk drive.

LINCII DATABASE: A database generated by the LINC system software; may be a DMSII database.

LOGIC & INFORMATION NETWORK COMPILER (LINC): A software development tool that may be used to generate a DMSII database and any number of applications to access the database.

LOGICAL AUDIT BLOCK: For DMSII databases, a structured package containing potentially many Audit Records (in the extreme situation, it is also possible that a single Audit Block could only contain a partial audit Record).

LOGICAL AUDIT FILE: For DMSII databases, the sequential storage of Audit Blocks that contain Audit Records. One Logical Audit File may contain 1 or more Physical Audit Files (Sections or Partitions). The sequence of Audit Blocks is spread, round robin fashion, among the Audit Sections.

LOGICAL RESYNCHRONIZATION PROCESS (CATCHUP): In an RDB system, the mode of resynchronizing the primary and secondary audit trails following a network failure during normal audit transfer.

NON-PARTITIONED AUDIT FILE: In a DMSII system, an audit file that has one section or partition. Equally, an audit file that contains one physical file.

NON-SECTIONED AUDIT FILES: Same as NON-PARTITIONED AUDIT FILES.

NORMAL AUDIT TRANSFER: In an RDB system, the uninterrupted transfer of audit data from a source database host to a remote host while the source database is being updated.

ORIGINAL AUDIT TRAIL: In an RDB system, the audit trail of the source database.

PACKET (OF AUDIT DATA): For DMSII databases, a collection of one or more audit blocks.

PARALLEL BUFFERS: Any number of storage areas each of the same size.

PARTITIONED AUDIT FILE: For DMSII databases, a logical audit file that is partitioned into a predefined number of physical files.

PERIODIC SYNCHRONIZATION: In an RDB system, audit synchronization that takes place only when complete audit files become available for transfer to a remote host (i.e., following an audit file switch).

PHYSICAL AUDIT FILE: A physical file containing Audit Blocks. May be 1 of many sections of a Logical Audit File.

PORT FILE NETWORK COMMUNICATION: In an RDB system, the method of messaging and data transfer between a source database system and a remote backup system.

REMOTE DATABASE BACKUP: A disaster recovery capability for DMSII-based databases that enables the replication of an audit (primary) database on a secondary host. The replicated (secondary) database is kept up-to-date with the primary database through the application of audits from the primary database. When the primary database becomes unavailable, the secondary database can take over the role of the primary database.

REMOTE HOST: In an RDB system, the host that contains the duplicate copy of the source database. Also know as the Secondary Host.

RDB SYSTEM: (Remote Database Backup): This is a Unisys Corporation system for backup of a database and is referenced by a Unisys Publication item 8600-2052-304 dated December, 1998, entitled *"Remote Database Backup—Planning and Operations Guide."*

RDBSUPPORT LIBRARY: In an RDB system, the library that is accessed by the shared task, database utilities, and additional applications responsible for configuring an RDB system. The library is also a running process responsible for initiating local and remote tasks through port file communication.

RDB UTILITY: The menu-driven user interface for defining, installing, and maintaining an RDB system.

RESYNCHRONIZATION MODE: Under the ABW audit file transmission mode of an RDB database, the process of bringing the audit trail of the secondary database back into the closest possible synchronization with the audit trail of the primary database. Also see Catch-up.

SECTIONAL AUDIT FILES: Same as PARTITIONED AUDIT FILES.

SEMANTIC INFORMATION MANAGER (SIM): A database management system that simplifies the task of modeling your application environment based on the semantic data model.

SERVER TASK: In an RDB system, a task that is connected to a remote host for messaging and data transfer.

SHARED DATABASE TASK: For DMSII databases, the running process accessed by all database applications to read and write data to the database and audit trail.

SIM-DATABASE: A DMSII database defined by SIM.

SOURCE DATABASE HOST: In an RDB system, the host that contains the primary copy of the database.

SOL (STRUCTURED QUERY LANGUAGE): A standardized language for defining, querying, maintaining, and protecting the contents of a relational database.

SOL-DATABASE: A relational database made up of tables and views.

SYNCHRONIZED AUDIT TRAILS: In an RDB system, audit trails at a source and remote host that are exact duplicates.

SYNCHRONIZATION LEVEL: In an RDB system, the level at which the remote audit trail is kept current as a replicate of the source audit.

SYNCHRONIZATION (NEAR REAL TIME): In an RDB system, the level of synchronization achieved when each audit block is transferred to the remote host immediately after it is written at the source host.

SYNCHRONIZATION (PRESENT CONTEXT): In an RDB system, the process of updating a remote audit trail to replicate the source audit trail.

SYNCHRONIZATION—WITHIN ONE COMPLETE AUDIT FILE: In an RDB system, the level of synchronization achieved when an audit file is transferred to the remote host immediately following an audit file switch at the source host.

TAKEOVER: In an RDB system, the process that enables the remote database to assume the role of the source database.

TARGET HOST: In an RDB system, the host that contains the remote copy of the database.

General Overview

There are several remote database (RDB) audit transmission modes and these modes are essentially the key factors which influence how current the second database is aligned with the primary database. The following discussion will discuss the audit block transmission mode, Audit Block Write, (ABW), which is the subject of this invention.

AUDIT BLOCK TRANSMISSION MODE (ABW): The ideal situation of the ABW (Audit Block Write) mode is to transfer audit blocks to the secondary host just as they are generated on the primary host. Under this mode, RDB is able to establish and maintain the greatest degree of synchronization between the primary audit trail and the secondary audit trail thus providing the greatest degree of synchronization of the two databases.

The ABW mode transmits audit data to the secondary host on a block-by-block basis—as it is being written to the audit file on the primary host. The ABW mode makes constant use of the network communications. Network speed and capacity should exceed the audit generation rates to a sufficient degree such that the network does not impede the database throughput. The ABW mode makes the primary host dependent on acknowledgments from the secondary host. The secondary processor speed and capacity and its disk speed and capacity, must support the audit generation rates so that the secondary host does not impede the response times on the primary host. This mode automatically creates both the original and the duplicate audit files on the secondary host while transferring the audit data only once. Further, this mode operates with one of two possible options for handling problems occurring with audit block transmission.

Utilization of the ABW mode provides certain benefits which include synchronization of the audit trails on the primary and secondary host on a closer basis than is possible with file transfer modes. There is a minimal loss of audit information, which occurs during a disaster or other interruption. Then following a takeover, the restoration of database access is faster than with other modes.

ACKNOWLEDGMENT RATE: The acknowledgment rate is the rate at which the secondary host sends its acknowledgments to the primary host to indicate receipt of the audit blocks. The acknowledgment rate is set when the user defines the database characteristics for the primary and secondary hosts. A higher acknowledgment rate results with fewer demands on the network, with less risk of communication error and potentially less wait time between audit block transmissions resulting in a faster throughput.

However, the potential for less wait time can diminish at a certain increased acknowledgment rate because of the networking software buffering and other configuration and processor availability factors at the site being used. Experimentation can be done by increasing the acknowledgment rate for a period of time to observe the average and total Access routines amount of wait-time on the RDB utility statistics screen.

ACKNOWLEDGMENT AND AUDIT TRAIL SYNCHRONIZATION: The acknowledgment rate affects the audit trail synchronization in the audit block transmission (ABW) mode. In addition, the way in which the acknowledgment rate affects the audit trail synchronization depends on whether the audit files are "sectioned." There are non-sectioned audit files and sectioned audit files, which can be described as follows:

(a) Non-sectioned audit files: here the acknowledgment rate is defined as one acknowledgment message for every n audit blocks and the value n can be set from 1 through 99. The default value is 10. The audit trail synchronization is within 2*n minus 1 audit blocks, unless the secondary database is dropped. Here the * represents a multiplication operation.

(b) Sectioned audit files: the RDB system attempts to acknowledge every n audit blocks where n is the acknowledgment rate. The RDB software rotates the acknowledgment through the sections so that the same section does not always read the acknowledgment.

The audit trail synchronization will generally be within 2*n minus 1 blocks but actually could be a higher value, up to the number of audit sections. For example, if the number of audit sections is 3, the audit trail synchronization would be within (2*n minus 1) plus 3 blocks.

BUFFERS: In the DMSII XE software, the audit trail BUFFERS option will specify how many internal audit buffers are to be allocated when the database is running. If the BUFFERS option is not specified, then AUTOMATIC is the default value. Under AUTOMATIC, the Accessroutines automatically calculates the number of buffers to be ten times the number of sections declared for the audit trail plus one. For example, if the audit trail has eight sections, then eighty-one buffers are allocated unless otherwise specified.

SECTIONS: The SECTIONS option specifies the number of sectioned files into which the audit trail is to be divided. The default value is 1 (a single audit file, unsectioned). The value can be an integer in the range of 1 thru 63.

Dividing the audit trail into several sectioned files allows the I/O operations to the audit trail to be spread across several files. Sectioning of the audit trail, along with an improved internal locking and buffering scheme, can help relieve any audit trail bottlenecks impeding overall database throughput. Sectioning allows groups of audit blocks to be transferred on a concurrent parallel operation.

Each audit file is divided into a number of physical audit files designated by the SECTIONS option. The first section of an audit file retains a particular naming convention as follows:

(i) <database name>/AUDIT<n>(primary)

(ii) <database name>/2AUDIT<n>(secondary)

AUDIT TRAIL OPTIONS—EFFICIENCY: Increasing the audit trail block size decreases the number of I/O operations performed and thus improves database performance. However, a large audit trail block size also increases the amount of memory to be used for the audit buffers.

UPDATE EOF (END OF FILE): This is an attribute which controls the important trade-off in database performance. Small values for the update EOF option will reduce the number of disk read operations needed to locate the end of the audit trail during recovery. However, more write operations are performed to maintain the end-of-file pointer in block 0 during normal operation of the database.

DATA SET DECLARATION: A data set is a file containing data. The elements of the file are records or members that are composed of items. An item can contain data or it can contain control information or it can be a data set, a set, a subset, Access, remap, or a link item.

A data set is similar to a file in that it contains data, however, it differs from a conventional file in the following respects:

(i) The space within data sets is allocated and de-allocated by the system.

(ii) The system is responsible for retrieving the records requested by the user. The items in data sets can be data sets, sets, or subsets, or Accesses.

DESCRIPTION OF PREFERRED EMBODIMENT

In general, the present system relates to the situation of providing computer systems which will recall changes to its database in order to allow proper recovery of the database in the event of any failure. Operationally, there is used what is called a transaction, which is a set of related operations that change the content of a database from one particular state to another.

However, before a transaction can currently commit its changes to database, it is necessary that information about the database rows or records that are affected by the transaction be written to what is called an audit trail. An audit trail can be conceived as a history of changes to a database. Such audit trial may consist of a series of files having records which describe changes to the database. Thus, an audit trail record typically consists of a before and an after image of a modified database record.

Using the before images, the database system can undo incomplete modifications which occur when an application program aborts or fails to complete due to a system failure.

Utilizing after images, the database system can recover from media failures by restoring the old or inconsistent copies of database files and redoing the earlier modifications.

In usual operations, the series of files which constitute an audit trail are physically stored on a single disk volume. However, as successive audit trail files on that disk volume become full, there is sometimes used an archiving process which migrates these files onto tape and the files become available for storing newly generated records.

This particular method of utilization to the physical storage of audit trail files does involve certain disadvantages. A process that is storing newly generated audit records must then compete for disk access with the archiving of filled audit files. This leads to contention which can limit the rate of audit generation and the transaction processing speed.

Although the availability of tape for archiving old audit records removes any limit on the total amount of available storage, the archive audit trail files are not easily available for on-line recovery, since on-line recovery is limited to the audit records stored on the single disk volume.

Figure 9:
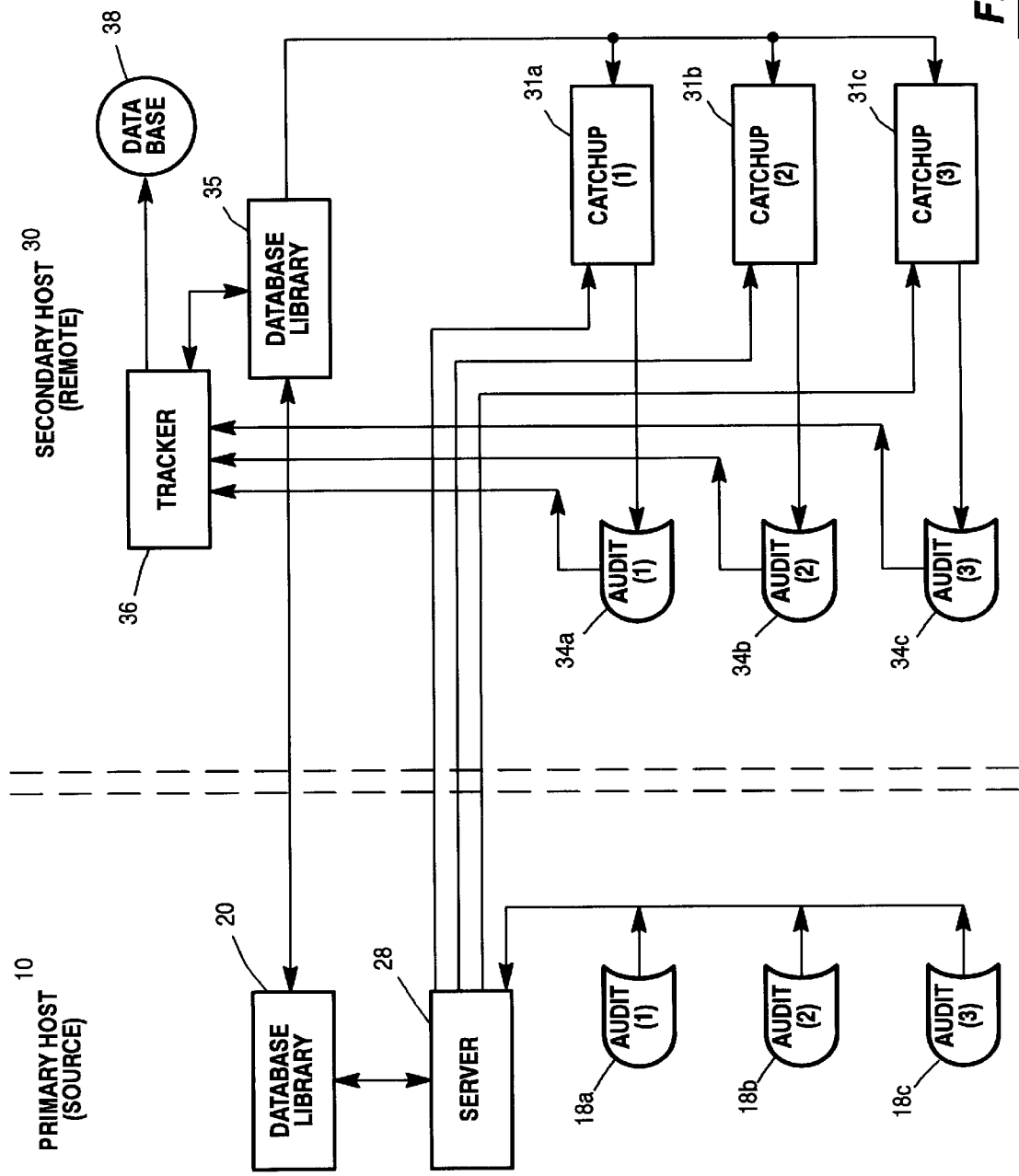
FIG. 9 is a schematic drawing showing how sectioned audits can be transferred between the primary and second hosts in a parallel set of asynchronous transfer operations.

The present invention relates to a method of asynchronously receiving multiple packets of audit data from a source database host in a resynchronization mode and then asynchronously writing the data at a target host. The audit trail for such a database consists of a contiguous order of audit files with no physical partitions. The resynchronization mode of such a target host normally consists of one physical process to receive multiple contiguous logical audit blocks and to write the blocks in a serial manner in order to duplicate the source audit trail. However, the presently developed transfer operation between source and target hosts is accomplished via sectioned audit files in a concurrently parallel transfer operation as seen in FIG. 9.

With the advent of physically partitioning logical audit files containing contiguously ordered audit blocks stored in a round-robin manner to multiple physical files (partitions), multiple asynchronous audit writes are enabled which can then result in faster audit generation at a source database host.

The prior normal physical process in the resynchronization mode required additional processing at the remote host in order to replicate the original audit trail, and this resulted in a process that was slower in duplicating a partitioned audit trail when this was compared to duplicating a non-partitioned audit trail. In this regard, if multiple logical audit blocks could be received asynchronously in a resynchronization mode for each physical partition of a logical audit file and then written asynchronously to corresponding physical files, then the time elapsed in the resynchronization mode was to be substantially reduced.

DATA FLOW UNDER AUDIT BLOCK TRANSMISSION MODE (ABW): With reference to FIG. 1, the normal flow of audit blocks in the ABW mode is illustrated. With the ABW mode, audit block images are transmitted from the database stack 14 through the ACR-PORT I/O Task 22 which is processed from the RDB Support Library 20 on the primary host 10 by way of the ACR_PORT port file 10*p*, 30*p*, to the Audit server task 32 on the secondary host, 30.

The Audit server task 32 on the secondary host 30 then writes the audit block images to an audit file 34 on disk. Tracker 36 later reads these audit files from disk and applies these audit block images to the secondary database, 38.

INITIATION OF DATA TRANSMISSION: The creation of an audit block image initiates the data transmission from the primary host 10 to the secondary host 30. This data transmission is part of a DMSII audit block write (ABW) operation that includes several items:
  (a) The logical (direct I/O) write to the audit disk file 18 on the primary host 10. This logical write waits for the completion of the physical write to disk.
  (b) The logical (port file I/O) write to the ACR_PORT port file (10*p*, 30*p*) that leads to the secondary host 30. This logical write waits for an event that indicates the completion of the port file I/O write, as developed below:
    (i) The write always waits for a write result from the MCP (Master Control Program) indicating that the port file I/O write has occurred.
    (ii) When an acknowledgment is required, the write waits for a message acknowledgment from the Audit server task 32 on the secondary host, 30.

The following actual order of the events occurs: firstly, there is a disk write; second, there is a disk wait; third, there is a network write; and fourth, there is a network wait.

OPERATIONAL STEPS FOR THE PORT FILE I/O WRITE OPERATION: The steps that complete the port file write operation (FIG. 3) are indicated below as follows:
  (a) The network 26 transmits the write operation from the primary host 10 to the secondary host 30. When an audit block acknowledgment is required, the RDB Support Library 20 indicates the requirement by setting a field in the port file I/O message.
  (b) The Audit server task 32 reads the write operation from the corresponding port file 30*c* on the secondary host 30.
  (c) when required, the Audit server task 32 writes an audit block acknowledgment to the CU port file on the secondary host and the network 26 transmits the audit block acknowledgment from the secondary host 30 to the primary host 10.
  (d) When an acknowledgment is requested, the primary host writes and transmits n–1 more audit blocks, where (n is the acknowledgment rate) before it reads the acknowledgment from the secondary host.

The audit block acknowledgment confirms only that the Audit server task 32 has received the audit block. Waiting for audit block acknowledgment might impose a delay on the auditing process in the primary host, 10. However, this is the only way to confirm that the audit blocks are present on the secondary host 30.

SECONDARY HOST HANDLING OF THE AUDIT BLOCK: After receiving the audit block and sending an audit block acknowledgment, when required, the following actions will occur on the secondary host 30:
  (i) The Audit server task 32 writes the audit block to the audit file 34 on disk;

(ii) Tracker 36 reads the audit block.

PRIMARY DATABASE FOR UPDATE: When the primary database is first opened for an update, the following sets of actions will take place:

(a) The RDB Support Library 20 on the primary host 10 initiates an Audit server task 32 on the secondary host 30 for each section of the audit file. Then steps b, c, d, e are repeated for each section of the audit file. Sectioning was earlier discussed in the General Overview portion.

(b) The Accessroutines 12 writes the first audit block on the primary host;

(c) The Accessroutines 12 stops further database activity until the Audit server 32 on the secondary host 30 acknowledges receipt of the first audit block for that section;

(d) The RDB Support Library 20 on the primary host 10 receives the acknowledgment and informs the Accessroutines 12 for the primary database.

(e) The Accessroutines 12 completes the audit block write process and allows the processing to continue.

Figure 3:
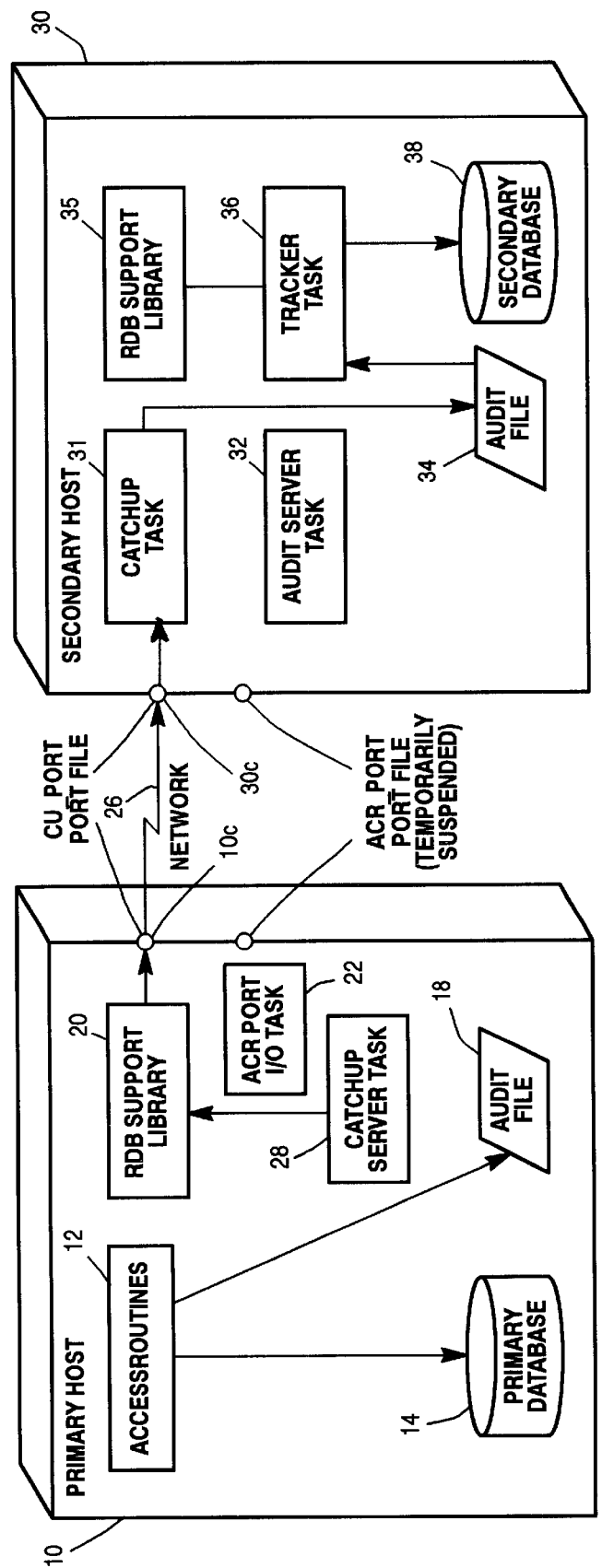
FIG. 3 is an illustration of operations between a primary host and secondary host illustrating the use of the Catch-up process for speeding-up the synchronization between a primary audit trail and a secondary audit trail.

It is possible to set up a port I/O time out value to specify the maximum length of time that the RDB Support Library 20 on the primary host waits for an audit block acknowledgment. When the time out period is exceeded under a Drop option, then control of the audit transmission process passes over to the Catch-up process (FIG. 3).

FIG. 1 shows how the remote database (RDB) components work together under the ABW mode. There is seen the primary host 10 and the secondary host 30. These two hosts communicate through network connections described later.

When the user opens up the primary database 14, the RDB Support Library 20 is invoked. The RDB Support Library in turn initiates the audit server 32 on the secondary host, 30.

The ACR-PORT I/O Task 22 then takes the audit images from the primary database 14 on the primary host 10 and transfers these images to the Audit server 32 on the secondary host, 30.

Under the ABW audit transmission mode, the audit server 32 then writes the images to the secondary database audit file 34. The Audit server 32, with the RDBSUPPORT program and the Catch-up (31, FIG. 3), then maintain synchronization of the two audit trails. The Tracker 36 on the secondary host maintains synchronization of the two databases by applying the audit images from the audit trail to the secondary database, 38.

ABW MODE TASKS FOR SECTIONED AUDIT FILES:

On the primary host 10, the ACR port I/O task 22 is responsible for sending audit blocks to the secondary host through a dedicated sub-port of the ACR port. On the secondary host 30, the audit server 32 receives audit blocks and writes them to the appropriate audit section. A database schema defines a section as well as all other physical database attributes. The system generates one ACR port I/O task and one audit server task for each audit section. These tasks are always present on both the primary and secondary hosts to provide swift response in the event of a takeover, i.e., switching the job function of primary host to that of secondary host.

TRACKER: The Tracker 36 is an asynchronous remote database (RDB) task program declared and processed from the Data Base Stack 14. The Tracker task appears on either host as:

<database name>/TRACKER.

Tracker is initiated when (i) the database is opened at either the primary or secondary host; (ii) audit images are received at the secondary host; (iii) the RDB-agent detects that a Catch-up process 28, 31, of FIG. 3, is necessary; (iv) a RDB utility acknowledgment is performed.

TRACKER OPERATIONS: Tracker 36 (FIG. 3) performs a certain number of operations as follows:

(a) On the secondary host 30, Tracker 36 reads the audit images from the audit file trail and applies these images directly to the secondary database 38 through a mechanism similar to a rebuild recovery mechanism. Tracker does not reprocess transactions.

The reading and applying of audit images occurs in two separate phases. During the first phase, known as pre-scanning, Tracker reads the audit file looking for a point at which no transactions are in progress. Such a point is known as a quiet point.

During the second phase, Tracker begins to apply all audit images from its current position in the audit trail to the quiet point found during the pre-scanning phase. In other words, Tracker applies audit images from transactions to the secondary database. Tracker does not apply actual transactions.

(b) On the primary host 10, Tracker is always initiated by the first database opener. In most cases, Tracker quickly goes to the end of task (EOT). If a halt/load recovery is needed, however, Tracker waits for the DMRECOVERY task to complete, and then applies any audit after-images required by the recovery before going to EOT.

(c) Under the ABW audit transmission mode, Tracker initiates the Catch-up task (FIG. 3) as soon as it reads to the end of the audit trail at the secondary host and it detects that the primary and secondary audit trails are not synchronized. The Audit Block Serial Numbers (ABSN) are used to determine whether the primary and secondary are out of synchronization. These numbers are logically assigned in a round robin fashion to audit blocks in each section before they are transmitted by the source host. The RDB Support Library on each host maintains a list of ABSN values that are globally accessible by any processes that are involved in the transmission of audit blocks between the two hosts. The tracker on the secondary host communicates with the RDB server on the source host to keep track of ABSN values that have been transmitted. As soon as an out of synchronization condition is detected, the tracker is able to determine the ABSN number of the audit block from which re-transmission has to start, by accessing the last successfully received ABSN value from the RDB Support Library.

TRACKER AND INQUIRY PROGRAMS WORK TOGETHER: Because of database integrity constraints, Tracker must have exclusive use of either database when it is applying audit images. Consequently, when Tracker 36 is applying audit images, inquiry programs are locked out of the database. Conversely, when inquiry programs are accessing the database, Tracker is not able to apply audit images.

Lockout Time is the time that users are unable to read data from a database because Tracker may be in the process of changing the database.

Inquiry programs and Tracker lock out each other from the database only during the time that Tracker applies audit images. The length of the lockout time is dependent on the contents of the audit trail; the time also varies by site of database. Tracker does not lock out inquiry programs while Tracker is pre-scanning the audit trail.

If the Tracker task does not terminate normally, it locks out all inquiry programs when it resumes applying audits to the database until it comes to a point where the database is in a consistent state. At that point, Tracker again allows inquiries while it is pre-scanning audits.

Each time Tracker comes up, the inquiry programs are locked out until Tracker can ensure the integrity of the secondary database.

CATCHUP AND CATCHUP-SERVER: The Catch-up 31 and the Catch-up Server Tasks 28 operate only when the RDB system is functioning under the ABW audit transmission mode. Their combined functions are called the audit synchronization process. This process is designed to bring the secondary database audit trail back into synchronization with a primary database audit trail when the former (secondary database) is behind the latter (primary database audit trail).

The Catch-up and Catch-up Server Tasks are part of the Catch-up process shown in FIG. 3. This operates in the following way:

(a) Whenever Tracker 36 on the secondary host 30 reaches the end of the audit trail, Tracker determines whether the audit trails are still synchronized. If they are not synchronized, then Catch-up is then initiated at the secondary host.

If a communication problem prevents the Catch-up process from initiating immediately, then the RDB-agent task (discussed below) which is given the name <database name>/RDB/AGENT, attempts communication with the other host at the following types of intervals:
  (i) on the primary host, one minute following an audit transmission error and every five minutes thereafter;
  (ii) on the secondary host, every five minutes following an audit transmission error.

The RDB-agent task is an asynchronous task processed from the RDB Support Library 20.

This task stays in the mix as long as the RDB software is executing.

(b) The Catch-up Server Task 28 reads audit blocks on the primary host and sends these blocks to the Catch-up task 31 on the secondary host.

The Catch-up Server Task appears on the primary host as:

<database name>/CATCHUP/SERVER/<secondary host name>.

(c) The Catch-up task 31 operates on the secondary host and writes to the audit file the incoming audit blocks sent by the Catch-up Server Task 28. The Catch-up task 31 also acknowledges receipt of the audit blocks.

<database name>/CATCHUP.

(d) The Catch-up task 31 communicates with the Catch-up Server Task 28 to determine when the Catch-up process is complete.

(e) If Catch-up terminates abnormally or unsuccessfully, it then restarts automatically after the synchronization restart interval has elapsed.

USE OF PORT FILES BY THE RDB: The RDB system uses the network port file communications facility for host-to-host communication. The RDB uses three port files described as follows:

(a) PORT: This serves the RDB utility and the Accessroutines for communication between the primary 10 and secondary host 30.

(b) ACR_PORT: under the ABW mode, this port (10p, 30p) serves the Accessroutines for the transfer of audit images during normal operations.

(c) CU_PORT: under the ABW mode, this port (10c, 30c) serves the transfer of audit blocks during the Catch-up process.

CHARACTERISTICS OF PORT port FILE: The PORT port file is used to communicate status information while the database is open or the RDB utility is running. The PORT port file transfers the RDB utility information between the RDB server and the RDB Support Library 20. This port file has the following characteristics:

(i) The traffic on this port file is normally intermittent;

(ii) This port file only closes when the RDB Support Library 20 for the database goes to the end of task (EOT), or when there is a communication error.

The ACR_PORT port file (10p, 30p) is used only during normal audit transfer operations when the ABW audit transmission mode is set. This file operates with the following characteristics:

(a) Messages consist of audit blocks that, as they are filled, are sent from the primary host to the secondary host;

(b) Traffic on this port file is directly proportional to the primary database audit generation;

(c) During the Catch-up task, this port file can be open, but audit block transfers only occur through the CU_PORT port file, (10c, 30c).

The Database Stack 14 causes the ACR_PORT port file to be opened during a database open operation. An ACR_PORT port file task appears in the mix as:

<database name>/ACRPORTIO.

CU PORT PORT FILE CHARACTERISTICS: The CU_PORT port file (10c, 30c) is open only during Catch-up audit transfer operations. This file has the following characteristics:

Messages consist of audit blocks that are sent from the primary host to the secondary host.

Traffic on this port file is heavy and continuous.

As soon as Catch-up stops running, this port file closes.

SECTIONED AUDIT FILES AND PORT FILES: The RDB system transfers audit images from "sectioned" audit files through sub-ports of each port file (one sub-port for each section). The sub-port (ACR-PORT) used is the section number plus 3. For example, in an audit file with three sections, the name of the task for the third section would be:

<database name>/ACRPORTIO/2

The present discussion will refer to the audit transmission mode (ABW). In operation of the audit block write (ABW) situation, then when an audit block is written to the audit file 18 on the primary host, it is automatically transmitted by way of the network 26, FIG. 3, to the audit file 34 on the secondary host. It is, of course, desirable to get the best possible audit trail synchronization as near as possible to real time. For the best case scenario, this may work out to within one audit block of non-synchronization on a non-sectioned audit file with an acknowledgment rate value of 1.

When the system transfers audit images block-by-block, the data in the remote database operation (RDB) is considered to be backed-up when the audit records for that have been copied from the primary host to the secondary host. However, at this point, the information in the audit trail has not yet been applied to the secondary database. Therefore, it can be seen that the primary and secondary databases are not necessarily synchronized even though their audit trails may be synchronized with respect to the audit files 18 in the primary host, and 34 in the secondary host.

As an example, if the system should happen to run the same inquiry on a newly-updated record on both the primary and secondary hosts simultaneously, there will, of course, be a retrieval of different answers if the updated particular record is still remaining in the audit trail of the secondary host and has not yet been applied to the secondary database 38. The remote database (RDB) software ensures that the primary database 14 and the secondary database 38 are synchronized by applying the audit images to the secondary database as they are received on the secondary host.

SYNCHRONIZATION LEVELS: The level of database audit trail synchronization that is chosen is tied onto two key factors of database recovery operations: (i) the amount of time required to reestablish the database access following any interruption; and (ii) the amount of data that will be lost as a result of such an interruption.

If there is a secondary database audit trail 34 that is synchronized with its primary database audit trail 18, then when the primary database audit trail 18 becomes available, the system is in a good position to recover the database quickly with a minimal loss of data. It is also a good situation to recover operations quickly and with a minimal loss of data if the RDB is operated at a delayed level of synchronization. The reason for this is because there is a database already set-up to take over the operations of the primary database, so it is then possible to apply outstanding audits as quickly as possible and still be back online for normal operations in a minimal length and predictable length of time.

In operating under a particular level of synchronization, it is necessary to consider the impact of the fact of losing data should the primary database become unavailable. Thus, the more closely synchronized that the audit trails 18 and 34 are, then the smaller amount of data that could be lost should a primary host failure occur.

The network with the databases, the hosts, and the workload and performance involve a tightly integrated system of operations. A heavy workload on any one component can impact a performance of the other components. For example, heavy network traffic can cause a degradation in database performance. Thus in this case, the more closely synchronized the audit trails 18 and 34 are, then, the more sensitive the environment becomes to heavy workloads placed on any one of the components.

The present system involves a method of asynchronously receiving multiple packets of audit data from a source database host 10 in a re-synchronization (Catch-up) mode and asynchronously writing the data onto a target host 30. The audit trail for such a database normally consisted of a continuous order of audit files (18, 34) with no physical partitions.

The resynchronization mode of such a target host 30, consists of one physical process to receive multiple contiguous logical audit blocks and write the blocks in a serial manner is order to duplicate the source audit trail 18.

In the advent of physically partitioning the logical audit files containing contiguously ordered audit blocks stored in a round-robin manner (FIG. 6) to multiple physical files (partitions), then multiple asynchronous audit writes are enabled which result in a faster audit transfer from the source database host 10 to the secondary host 30.

There is one physical process in the resynchronization mode (Catch-up) which requires additional processing at the remote host 30 in order to replicate the original audit trail 18. This results in a process that is slower in duplicating a partitioned audit trail when compared to duplicating a non-partitioned audit trail. In this respect, however, if multiple logical audit blocks could be received asynchronously in a resynchronization (Catch-up) mode for each physical partition of a logical audit file and then written asynchronously to corresponding physical files, then the time elapsed in the resynchronization mode could be considerably reduced.

Performance improvement is achieved by asynchronously receiving multiple packets of audit data from a source database host 10 over a communications network 26 and then asynchronously writing the audit data to multiple physical files 34, 34a, 34b, 34c, FIG. 9 at a target host 30. To implement this performance improvement, the so-called logical synchronization process is referred to as the Catch-up and consists of multiple physical Catch-up processes which are executed automatically by the back-up database system at the remote host 30. Initially, the back-up system recognizes that the resynchronization process (Catch-up) is required, and from its shared database library task (RDB Support Library 20, 35) will then initiate one physical Catch-up task for each physical audit file partition.

Figure 2:
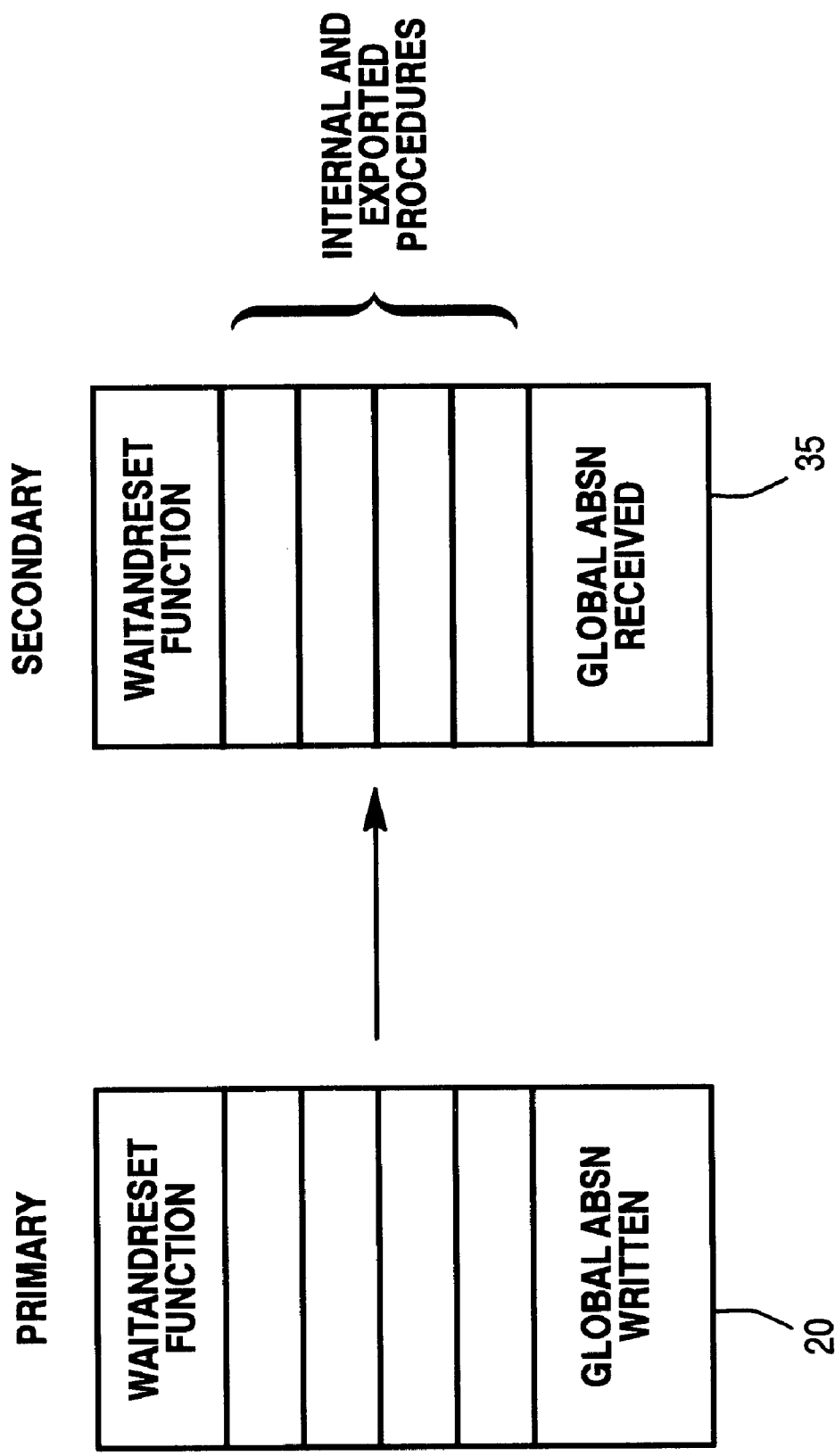
FIG. 2 is a drawing illustrating the use of a primary and a secondary RDB support library.

The method by which the secondary host recognizes that the resynchronization process is required consists of a TRACKER process 36 running at the secondary host that reads the Audit blocks which it uses to update the Database. When an End Of File is reached reading the audit file, the tracker checks with the Primary host 10 for a loss of synchronization. If a loss of synchronization is detected, the tracker 36 at the secondary host 30 causes an event called START_CATCHUP to its RDB Support Library 35. The WAITANDRESET process running continuously within the RDB Support Library monitors for the START_CATCHUP event to be caused by the tracker process. This is shown in FIG. 2 where the Primary RDB Support Library 20 sends Global ABSN values to the Secondary RDB Support Library 35. The START_CATCHUP event is recognized by the WAITANDRESET process, which then builds, for each section of the audit file, the parameters of the point from which resynchronization is needed. These parameters are further discussed in detail in FIG. 6. The WAITANDRESET process, acting on the causing of the START_CATCHUP event passes these parameters to execute the CATCHUP processes, initiated for each section of the audit file. FIG. 2 indicates the internal and exported processes running from the RDB Support Library during the resynchronization process.

The first physical Catch-up task is one that is responsible for opening the port files of all Catch-up and initiating the server task at the source host Database Stack 14 by calling through the database library (RDB Support Library 20). The catch-up server task at the source host 10 reads logical audit blocks in the order in which they were written and stores multiple blocks in parallel buffers, one per partition, for transfer to the remote host 30. These buffers are located in the Catch-up Server Task 28, FIG. 3.

The parallel buffers are only used in FIG. 3 by the Catch-up Server Task 31. FIG. 1 depicts normal audit transfer (i.e., database activity when no Catch-up is needed).

Each time a Catch-up task receives a group of contiguous physical audit blocks, it writes them to the corresponding physical file (audit file 34). Each time the Accessroutines server 12 fills a buffer in Catch-up Server 28, then a Write of the buffer is initiated to the secondary host 30 and the server 12 continues reading the logical audit blocks and storing them in the buffers intended for the Port Writes (ports 10p, 30p) (FIG. 1) until another buffer is full and another Write is initiated.

This process repeats itself until the server 12 determines that the source and remote audit trails (18 and 34) are synchronized.

Once all audits of this process are written at the remote host 30, then the Catch-up tasks (31, FIG. 3) terminate and then normal audit transfer will resume.

As indicated above, each physical Catch-up task receives its multiple packets of audit data asynchronously and furthermore, each Catch-up task 31 executes each Write to its corresponding physical file 34 asynchronously.

Figure 4:
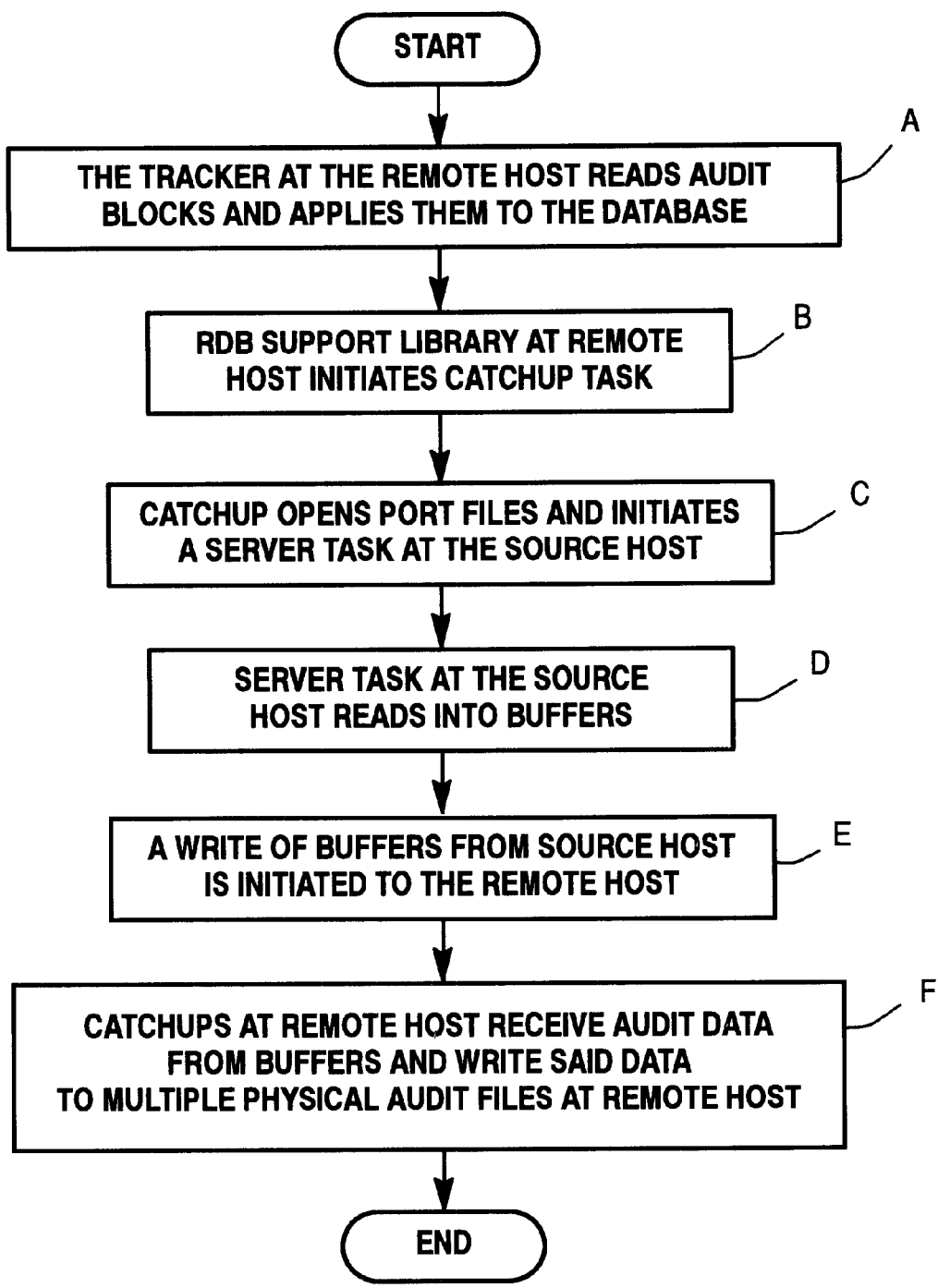
FIG. 4 is a flow chart showing the steps involved in the audit trail transport process between a primary and secondary database with the use of the Catch-up process for expedition of synchronization.

An overall view of the presently-described synchronization process is shown in FIG. 4. Referring to step (A), the Tracker (36, FIG. 3) at the remote host 30 will read the audit blocks and work to apply to the secondary database 38.

At step (B), the RDB Support Library 35 at the secondary host 30 will initiate the Catch-up task 31 shown in FIG. 3 via the network 26.

At step (C), the Catch-up task 31 opens the port files 30c and initiates a Catch-up server task 28 in the primary host 10.

At step (D), the Catch-up Server Task 28 in the primary host 10 reads the audits and writes them to a series of buffers.

At step (E), there is then a Write of buffers from the source host 10 which is initiated over to the remote host 30.

At step (F), the Catch-up task 31 at the remote host 30 will receive the audit data from the buffers and Write the data to multiple physical audit files 34 in the remote or secondary host 30.

Figure 5:
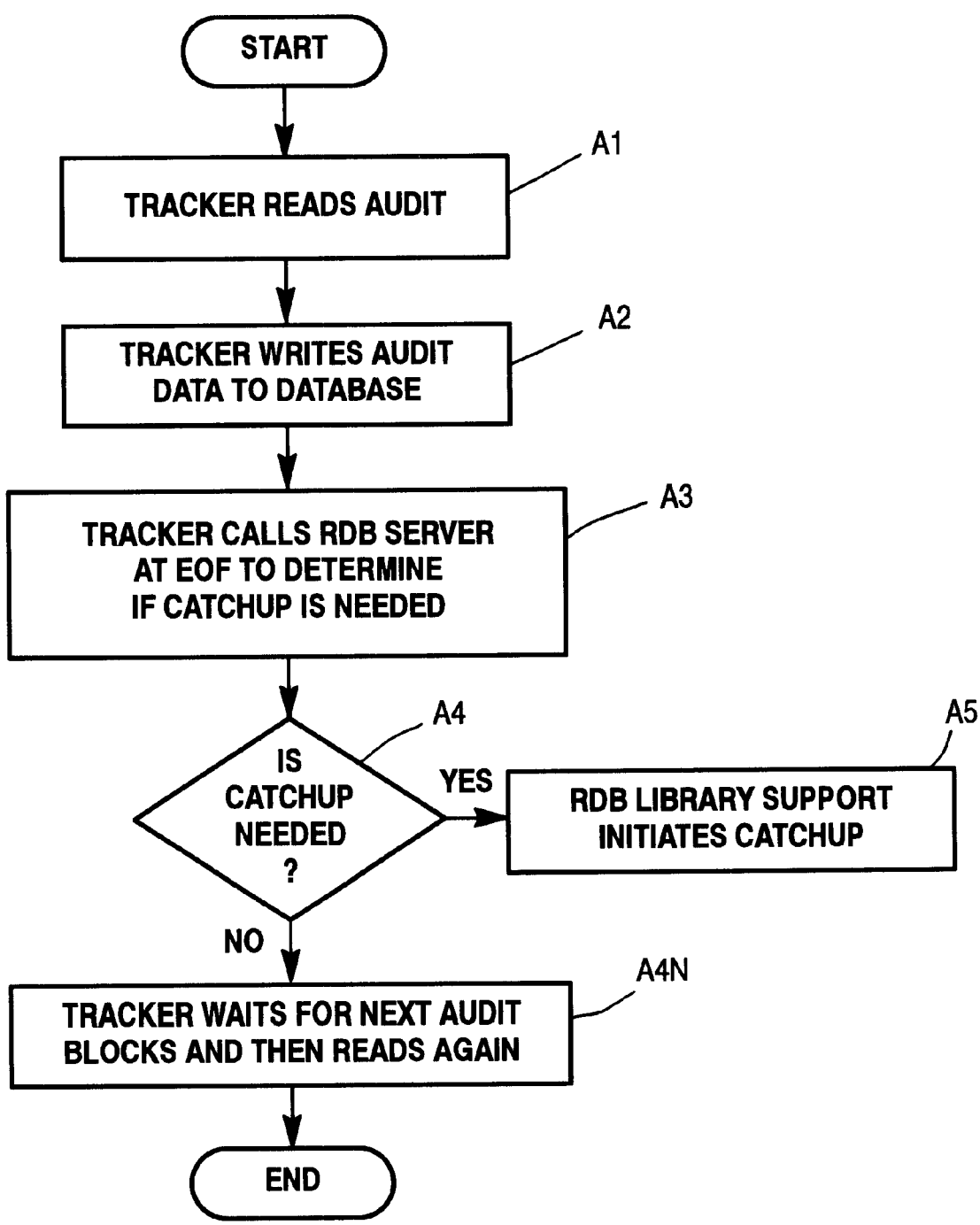
FIG. 5 is a flow chart illustrating the operation of the Tracker mechanism to determine whether there is a need for the Catch-up process for audit trail synchronization.

FIG. 5 is a flow chart illustrating the sequential steps in the operation of the Tracker mechanism.

Referring to FIG. 5, at step (A1), the Tracker task program 36 will read the audit files 34 and then at step (A2) the Tracker will write the audit data out to the secondary database 38.

At step (A3), the Tracker 36 can also call the RDB Support Library 35 at the end of a file which consists of a group of audit blocks. This is done in order to determine if a Catch-up operation is needed. The Tracker 36 at the remote host 30, coupled with the help of the RDB Support Library 35, thus keeps track of the EOF (end of file) for each group of audit blocks it receives. Thus, an out of synchronization situation can be detected after encountering the EOF.

Then, at step A4, a decision block is reached in which a query involves whether or not a Catch-up operation is needed. If the answer is YES, then the sequence proceeds to step (A5) (where the RDB Support Library 35 will initiate the Catch-up by communicating to the Catch-up task 31 and also through the network 26 of FIG. 3.

At step (A4), if the answer NO, that is to say no Catch-up is needed, then the sequence proceeds to step (A4N) where the tracker waits for the next audit blocks and reads the audit blocks for transfer to the secondary base 38 from the audit file 34.

In summary, the Catch-up operation will substantially expedite the synchronization process. A Catch-up operation is needed following a network failure or transmission delay because once the network connection is reestablished, the audit trails are out of sync between the source and remote host. A process is needed that is able to transfer all necessary audit data faster than the rate at which it is being generated. In the past, non-sectioned Catch-up did this by having Catch-up Server 28 read multiple logical audit blocks into one large buffer before sending it through a port file to a remote host Catch-up task. In the present usage for sectioned audit, Catch-up Server 28 behaves similarly in reading the audit trail, but speeds up the process by storing the multiple logical blocks in large parallel buffers, 1 per audit section and sending each buffer through its own port file to its matching Catch-up task. These port writes occur asynchronously which speeds up the operation. The process is further sped up by each Catch-up task writing to its corresponding physical audit section asynchronously.

There is one Catch-up task for each section of audit. Each task is initiated simultaneously. Each task performed reads from its own port connection which corresponds to one audit section and then writes the data to the matching physical audit section at the secondary. The first Catch-up task (there will always be at least one) has the responsibility of initiating the Catch-up Server Task at the primary side.

Figure 6:
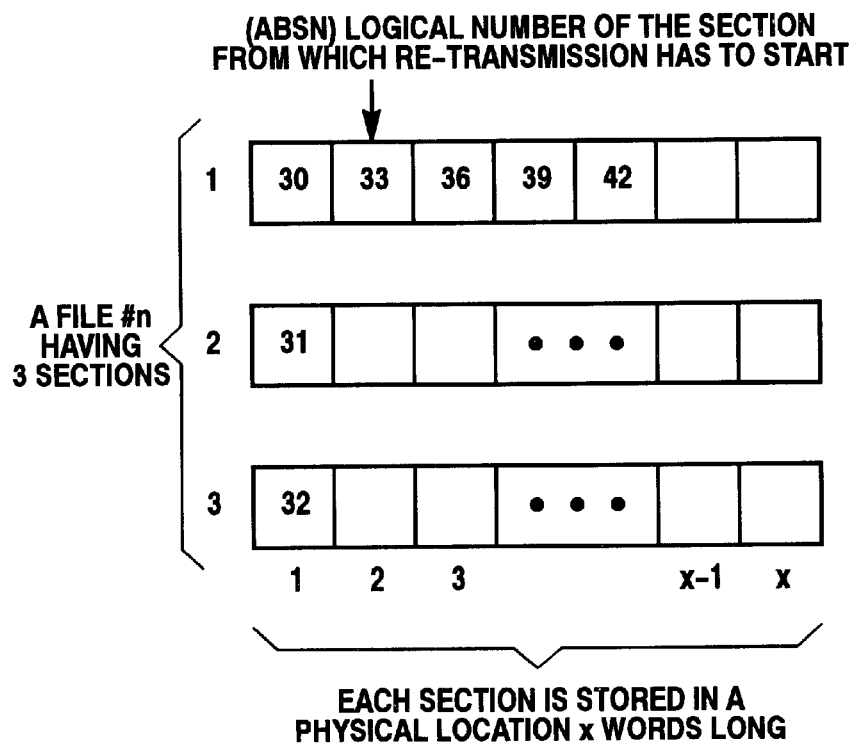
FIG. 6 is a drawing illustrating the variables needed to set-up the initiation of the Catch-up process.

FIG. 6 is a diagram illustrating the variables which need to be set up for initiating the Catch-up operation.

The file parameter "n" indicates which file is out of sync. It is a number denoting the file number. Number of sections is the number of sections (or partitions) in the file. "Begin Section" is the section from which retransmission has to start. That is, it is the section, as determined by the remote host tracker 36, starting from which the audit blocks will have to be retransmitted by the source host in a round robin fashion. A logical number is assigned to the blocks within sections in a round robin fashion. ABSN (Audit Block Serial Number) determines the number of the block within the "Begin Section (FIG. 6) from which retransmission will have to start. Also, each section occupies a certain physical amount of memory defined by number of words. The physical location parameter states the physical location in disk file of the block. identified by the ABSN in the Begin Section.

Figure 7:
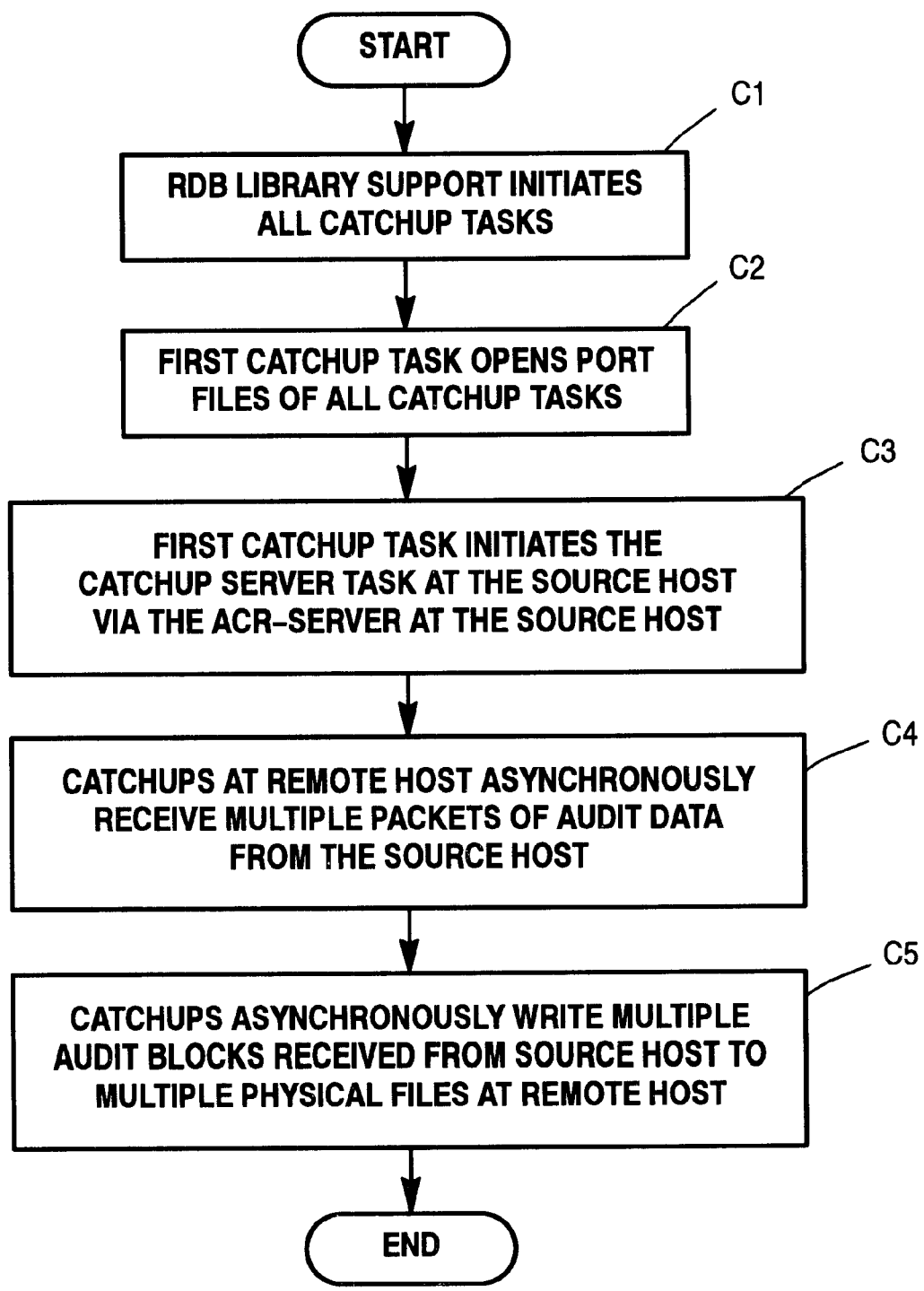
FIG. 7 is a flow chart illustrating the operations of the Catch-up mechanism to expedite the synchronization of audit trails between the primary and secondary host.

FIG. 7 is a flow chart showing the sequence of operations for the Catch-up mechanism.

At step (C1), the RDB Support Library 20 initiates the first Catch-up task on block 31 of the secondary host 30.

At step (C2), the first Catch-up task 28 functions to open the port files 10c, 30c of all the Catch-up tasks.

At step (C3), the first Catch-up task 28 initiates a server task at the source host 10 via the RDB Support Library 20.

At step (C4), the Catch-up task operations 31 at the remote or secondary host 30 will asynchronously receive multiple packets of audit data from the source host or primary host 10.

At step (C5), the Catch-up task operations 31 will asynchronously write multiple audit files received from the source host over to the multiple physical files 34 at the remote host 30.

Figure 8:
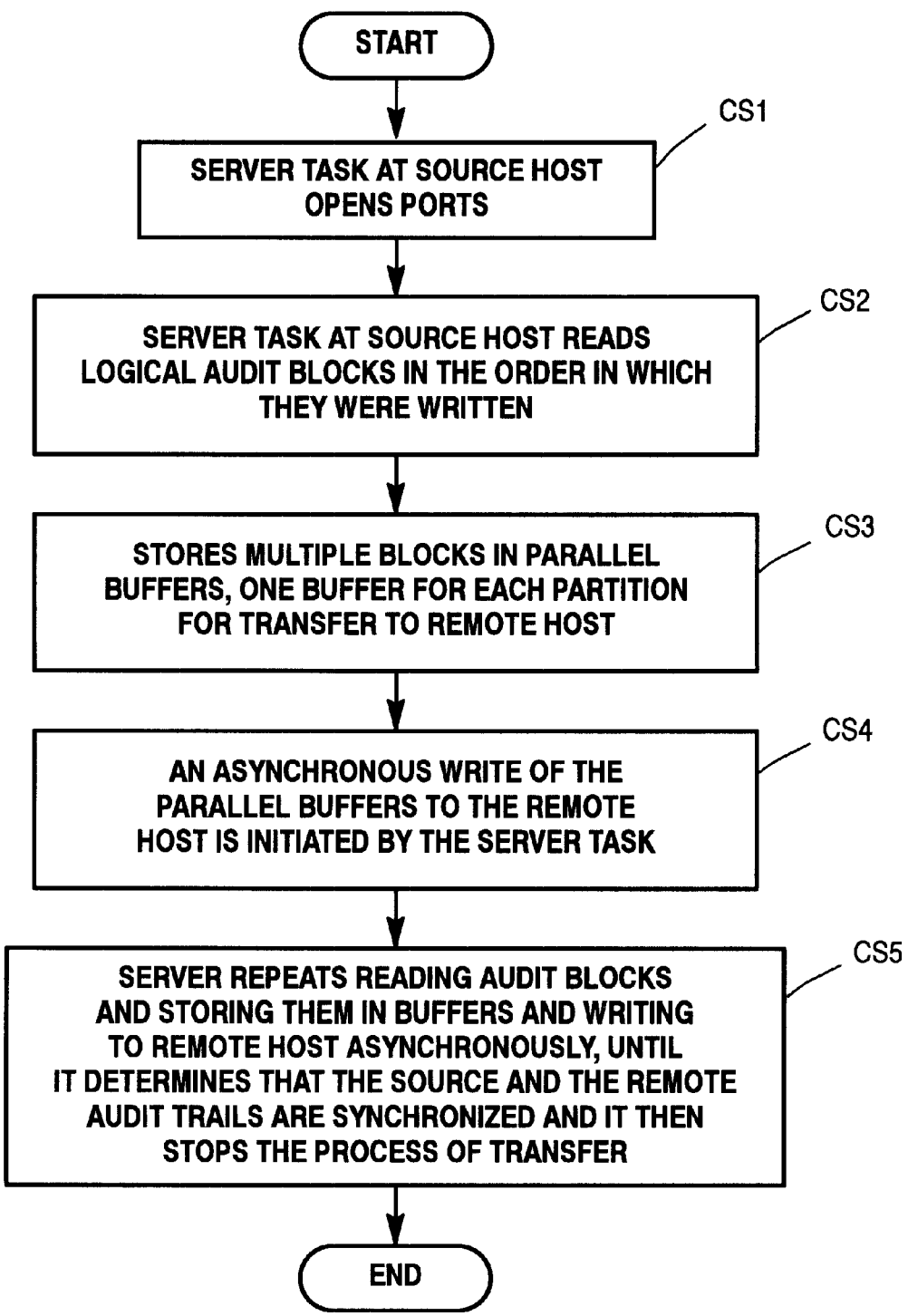
FIG. 8 is a flow chart illustrating the Catch-up Server Task for reading audit blocks and writing them asynchronously to the remote host until the audit trails are synchronized.

FIG. 8 is a flow chart illustrating the sequence of step operations involved for the Catch-up Server Task unit 28 of FIG. 3.

At step (CS1), the Catch-up Server Task unit 28 at the source host 10 will open the ports 10c, 30c.

At step (CS2), the Catch-up Server Task 28 at the primary source host 10 then reads the logical audit blocks in the order in which they were written. This is done from the audit file 18 (FIG. 3).

At step (CS3), the Catch-up Server Task unit 28 then stores multiple blocks in parallel buffers, with one buffer for each partition for enabling transfer to the remote host 30. The use of the parallel buffers enabling the transfer of a buffer for each partition thus provides a parallel set of transfer operations which speeds up the transfer of multiple audit blocks to the secondary host 30.

At step (CS4), there is an asynchronous writing of the parallel buffers to the remote host 30, which is initiated by the Catch-up Server Task 28.

At step (CS5), the Catch-up Server Task unit 28 repeats the reading of audit blocks and continues storing them in multiple buffers, then writing them to the remote host 30 asynchronously until the Catch-up server 28 determines that the source audit trail in audit file 18 is synchronized with the receipt audit file 34 in the secondary host 30 after which it then stops (END) the process of transferring audit blocks.

It should be seen that a "partition" is illustrated in FIG. 9, sections 18a, 18b and 18c. "Section" is a logical splitting of audit files into segregated blocks. Further, the audit blocks which are received from the source are read asynchronously by the Catch-up task unit 31 in a fashion which bypasses any serial reading of the logical blocks but rather in a parallel fashion from the multiple Catch-up tasks which are utilized by tracker 36 for storage in the secondary database 38 in their logical order.

Thus, by the use of parallel transfer modes for transferring the logically partitioned audit files, there is a more efficient transfer of audit blocks at a higher speed in order to expedite the synchronization process.

Referring to FIG. 9, there is shown a schematic diagram which illustrates the parallel and concurrent transfer of sectioned audit files from the primary host to the secondary host or remote host.

The remote Database Support Library 35 communicates with the Catch-up Server Task program 28 which, for illustrated purposes, is seen to have several sectioned audit files designated 18a, 18b, and 18c.

Then by use of the Catch-up port file 10c, 30c, FIG. 3 (CU__PORT port file), these sectioned audit files (18a, 18b, 18c,) are transferred over to the secondary host audit file and indicated as audit files 34a, 34b, and 34c.

Thus, in cooperation with the first Remote Database Support Library 20 and the secondary Remote Database Library 35, the Catch-up Server 28 can now transfer the sectioned audit files as multiple sectioned groups to be attended to by a series of catch-up process operations (31a, 31b, 31c) which work together in parallel to asychronously transfer the sectioned audit files to the Tracker 36 in the secondary host for placement onto the secondary database 38.

While earlier systems used only a single serial transfer mode for audit block conveyance to the secondary host, the present system now enables multiple sectioned audit files to be simultaneously and concurrently transferred to the secondary host for placement on the secondary database 38.

As a result, the secondary (backup) database 38 is maintained in useful synchronism with the primary (source) database 14. That is to say, that now the secondary database accurately reflects the data in the primary database at any given time period.

Described herein has been a method and system for synchronization of audit trails of a primary source host and remote secondary host to enable a secondary database to serve as backup to a primary database. A Tracker program senses the level of synchronization between the audit files of the primary host and secondary host to determine if there is sufficient lag (out of synchronization) between primary and secondary audit trails. If this is the case, a Catch-up program is invoked which divides the audit into sections which are expeditiously transferred in a parallel asynchronous basis from primary to secondary host for placement on a secondary backup database.

While one preferred embodiment of the invention has been described, it is possible that other embodiments may be implemented but which still utilize the invention defined in the attached claims.

What is claimed is:

1. A system for synchronizing the audit data of a primary database onto a secondary remote backup database comprising:
   (a) transfer means for conveying primary source audit trail files from a primary source host to secondary audit trail files of a secondary host;
   (b) sensing means utilizing a Tracker program to determine when said source and remote audit files are no longer in synchronization;
   (c) means for dividing each of said source and remote audit files into source sections and remote sections;
   (d) means for expediting the transfer of said source audit file sections over to said remote sections utilizing a Catch-up program when a pre-set disparity is sensed by said sensing means;
   (e) means for asynchronous and concurrent transfer of said source audit file sections onto said remote backup database said means including:
      (e1) multiple parallel port and path means for concurrently transferring multiple groups of audit file sections onto said remote database.

2. The system of claim 1 wherein said transfer means including:
   (a1) dedicated port means between said source and remote host to expedite transfer of audit trail files.

3. The system of claim 1 wherein said sensing means includes:
   (b1) means to compare the size of the source audit trail file with the size of the remote audit file.

4. The system of claim 1 wherein said means for dividing includes:
   (c1) schema means to package each said audit trail files in equally portioned sections.

5. A method for expediting the transfer of sectioned audit files from a source host database to a remote host database when a synchronizing sense parameter indicates an out-of-sync condition between source and remote sectioned audit files, said method comprising the steps of:
   (a) initiating a Catch-up procedure to expedite the transfer of source sectioned audit files for placement into said remote host as remote sectioned audit files;
   (b) utilizing a parallel transfer process to asynchronously and concurrently convey said remote sectioned audit files onto a remote host database which will duplicate said source host database.

6. A method for expediting the transfer of audit files from a source host database to a remote host database for development of a synchronized remote database which duplicates said source database, said method comprising the steps of:
   (a) transferring, via a port means, a set of source audit files over to a remote set of audit files;
   (b) partitioning said source audit files for receipt by said remote host as a set of sectioned audit files in equally partitioned sections;
   (c) sensing when said remote sectioned audit files are not in synchronization with said source sectioned audit files according to a pre-set parameter indicating amount of non-synchronization;
   (d) expediting the transfer of said remote sectioned audit files onto said remote host database via a parallel concurrent asynchronous set of transfer operations on said remote sectioned audit files.

* * * * *